Dec. 7, 1965  W. H. SEWARD  3,222,109
SEATS
Filed Sept. 16, 1964  3 Sheets-Sheet 1
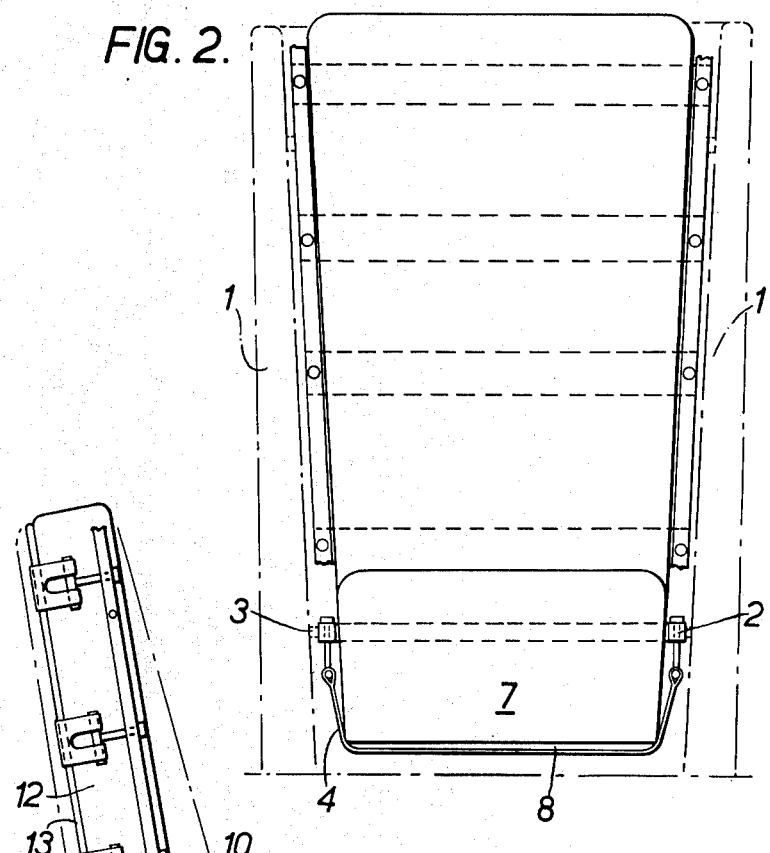
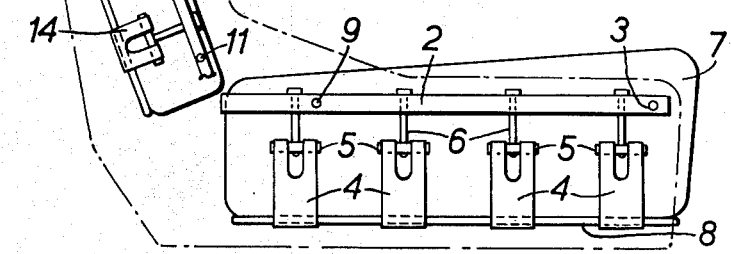
INVENTOR.
William Henry Seward
BY
ATTORNEYS Dec. 7, 1965  W. H. SEWARD  3,222,109
SEATS
Filed Sept. 16, 1964  3 Sheets-Sheet 2
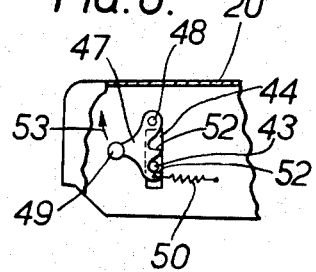
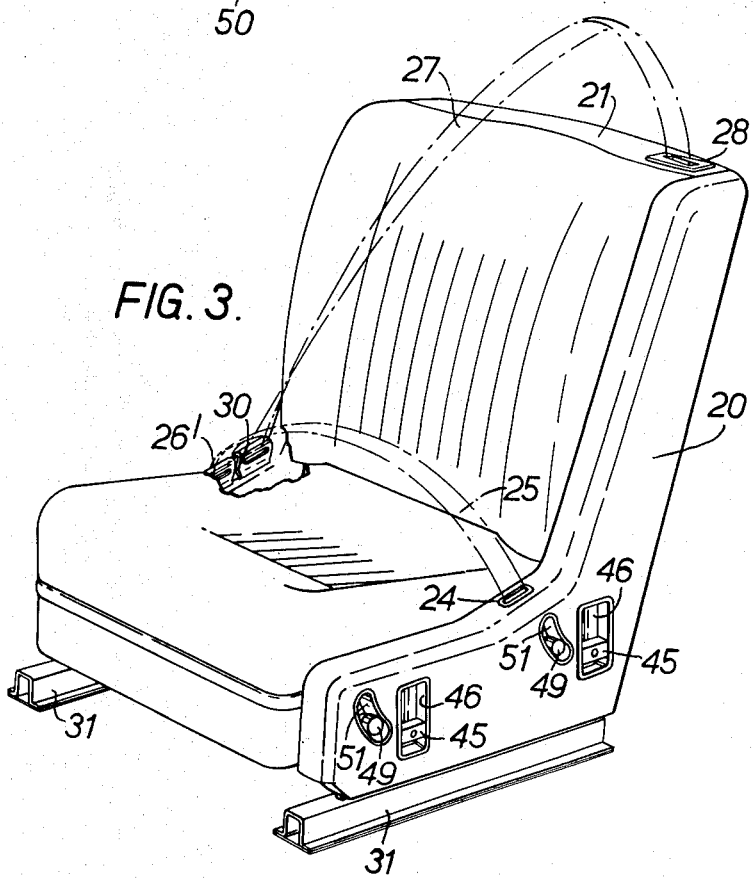
INVENTOR
William Henry Seward
BY
ATTORNEYS.

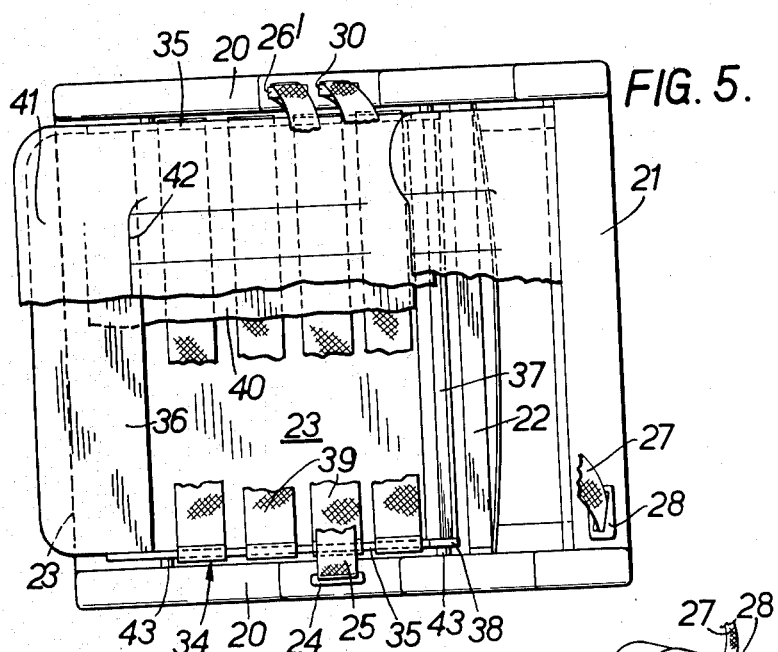
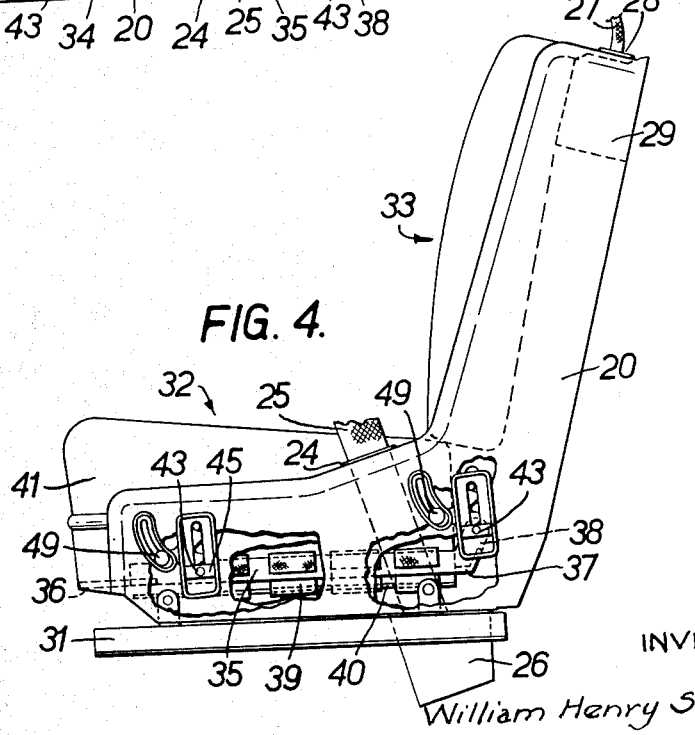

3,222,109
SEATS
William Henry Seward, Emsworth, England, assignor to Irving Air Chute of Great Britain Limited, Letchworth, England, a British company
Filed Sept. 16, 1964, Ser. No. 396,973
Claims priority, application Great Britain, Sept. 19, 1963, 36,940/63
11 Claims. (Cl. 297—452)

This invention is concerned with improvements in or relating to seats and especially to seats for use in motor cars.

One of the disadvantages of many conventionally sprung vehicle seats is that the occupant sits on the top of a slightly convexly curved internally sprung seat cushion, with the result that he is not located by the seat against sideways movement. Another disadvantage of conventionally sprung seats is that they tend to transmit to the occupant both the high frequency vibrations, which are one of the principal causes of fatigue over long journeys, and also low frequency high amplitude vibrations caused by bumps in the road.

It is an object of the present invention to provide a seat in which these disadvantages are reduced.

According to the present invention there is provided a seat base (i.e. the portion of a seat on which a person sits) or a back rest of a seat including a frame member from which depends a cradle serving to support therein a seat cushion or back squab respectively, said cradle being supported from the sides of the frame member so as to extend transversely of a seat incorporating said base or back rest and being of shallow generally U-shape, and resilient stiffening means forming the bottom of said cradle or positioned within and at or adjacent the bottom of said cushion or squab, said resilient stiffening means serving to maintain said cradle in said shallow generally U-shape but being such as to bow under the load of an occupant of a seat incorporating said base or back rest thereby to deform said cradle so that the sides thereof are drawn inwardly and a sideways pressure is exerted on the cushion or squab tending to locate and hold the occupant securely in position in the seat.

Thus, in use of a seat base according to the invention in a motor car seat, when the car, in passing over a bump, is subjected to a sudden upward acceleration the seat cushion tends to wrap itself around the occupant's buttocks and thighs so that he is located and held in a much more stable position than is usual on motor car seats. Similarly in cornering and/or accelerating a back rest according to the invention will also tend to locate and hold the occupant in position. Furthermore high frequency vibration of the seat is transmitted to the cushion or squab via the cradle and can be arranged to be largely dissipated along the length of the cradle and in turning through the right angle between the sides and bottom of the cradle. The cushion or squab is preferably made of a resilient sponge or foam material which when deformed is slow to recover its original shape, so that those vibrations which are not absorbed in the cradle are largely absorbed in the cushion or squab.

A seat may be formed with a conventional base and a back rest according to the invention, or with both base and back rest according to the invention herein set forth.

The resilient stiffening means may be a resilient panel forming the bottom of the cradle, the sides of the cradle being formed by straps connecting one pair of opposite edges of the panel to the sides of the frame member. Preferably however the cradle is formed by one or more straps or bands of flexible non-extensible material held in the U shape by the cushion or squab and stiffening means.

Preferably the cradle is formed of more than two straps and preferably each of the straps may be independently adjustable in length, so that the attitude of the cushion or squab may be adjusted to suit an individual occupant. Three or four straps are most convenient for the base of a seat.

The cushion or squab may be made up of a succession of layers of foam or sponge material of varying stiffness, with the stiffest layer at the bottom forming said stiffening means, or may be a homogeneous block of foam or sponge material which is attached to or seats onto said stiffening means. The preferred foam or sponge material is polyurethane foam which is preferably covered with a suitable material such as leather or leather cloth. Preferably the cushion or squab has a slightly concave upper or forward surface respectively.

When said stiffening means is not formed as part of said cushion or squab it may be a panel of plastic e.g. polyethylene, metal, wood, plywood, hardboard, or other suitable resilient sheet material.

The stiffening means may have a central portion stiffer than the rest so that if the car goes over a sharp bump the centre is not deformed and the occupant is thereof not unduly pinched. The extra stiffened central portion may be in the shape of a bicycle saddle.

The depth of the cushion or squab is preferably in the range of from two inches to six inches, and the cradle is preferably of such a depth that the squab stands above the frame member. The depth of the cradle can be about half or less than half the depth of the cushion or squab.

Means may be provided for adjusting the length of each of the straps simultaneously so as to alter the height of seat cushion or the position of the back squab. Such means may comprise a windlass at one side of the frame to which each strap is attached, means for turning the windlass being so diposed that it can be easily reached by the occupant when in the seat. Where means are provided for adjusting the lengths of the straps simultaneously at one side of the frame member, means for independently adjusting the lengths of the straps are preferably provided at the opposite side of the frame member.

Another desirable characteristic of a motor car seat especially the driver's seat is that it should easily accommodate occupants of different sizes.

Preferably therefore a seat has a main seat frame in which one end of the frame member of the seat base and/or of the back rest is connected to the seat frame for pivotal movement about a transverse axis to alter the inclination of the cushion or squab, means being provided to lock said frame member at a chosen inclination.

Preferably both ends of the frame member are connected to the seat frame for pivotal movement, locking means being provided at both ends so that both pivot points may be raised or lowered thus allowing height adjustment as well as a greater range of inclination adjustment.

Preferably only the frame member of the seat base is connected to the seat frame for pivotal movement. The frame member may be hinged to a transverse member of a seat frame or to the sides thereof.

The means for locking said frame member at a chosen inclination may allow for continuous adjustment within extreme limits, but preferably a catch is provided to allow a choice of predetermined positions. The locking means is preferably disposed so as to be easily operated by an occupant when in the seat, for instance on the outer side of the seat structure. Where both ends of the frame member are connected for pivotal movement three positions of adjustment at each end are found convenient.

A vehicle seat incorporating the present invention may be designed to withstand the stresses which will be encountered by the incorporation therein of a safety belt or harness. Such a seat may be provided with a safety belt or belts attached to suitable points on the seat frame. The safety belt(s) may be provided with retracting means and may be provided with inertia-operated locking means.

Two vehicle seats embodying the invention will now be described by way of example with reference to the accompanying drawings in which:

FIGURE 1 shows a diagrammatic side view of one form of vehicle seat,

FIGURE 2 shows a front elevational view of the seat of FIGURE 1,

FIGURE 3 shows a perspective view of another form of vehicle seat,

FIGURE 4 shows a side view partly cut away of the seat of FIGURE 3,

FIGURE 5 shows a fragmentary plan view of the seat of FIGURE 3,

FIGURE 6 shows a fragmentary cushion adjusting means.

The seat frame of the first form of vehicle seat shown in FIGURES 1 and 2 consists of two generally L-shaped rigid side panels or standards 1 formed of sheet steel or aluminum with flanges along their edges for added strength.

The seat base comprises a frame member 2 formed of a bar of steel bent into U shape, the ends of each leg of the U being hinged at 3 to one of the rigid side panels 1 of the seat frame near the front of the seat. Four straps 4 are shown as connected across the U shaped frame member 2 from opposite sides so as to hang down and form a shallow U shaped cradle. The straps 4 are equally spaced and are parallel, and are formed of nylon or other synthetic material webbing. The ends of each strap are secured to length adjustable T shaped windlasses, being passed over a short bar 5 and secured by stitching. The short bars are connected to the U shaped frame member 2 by Allen screws 6 to enable the straps 4 to be independently adjusted at their ends with respect to the frame member 2.

A cushion 7 of polyurethane foam with a slightly concave upper surface is seated onto a resilient stiffening panel 8 and is supported in the cradle. The cushion 7 is about twice as thick as the depth of the cradle so that it stands appreciably above or outwardly of the U shaped frame member. The cushion 7 is covered in a suitable material such as leather or leather cloth.

Near the back end of the seat each leg of the U shaped frame member is provided with a hole 9 which serves to receive an adjustable locking pin (not shown) mounted in the side panels 1 of the seat. This pin and means to operate the locking pins are disposed on the outside of the side panels where it is easily accessible by an occupant in the seat. It may be of the construction shown in the form of invention shown in FIGS. 3 to 6 inclusive.

The cushion 7 can thus be adjusted in two ways; the whole cushion can be tilted about its front end, and each strap 4 can be independently adjusted so that the attitute of the cushion can be altered slightly to suit an individual occupant. A tall occupant would alter the inclination of the seat 7 so that it tips down at the back, so as to accommodate his legs more comfortably (which have had to be bent at the knees more than a person of average height).

The back rest 10 of the seat is similar in mounting to the seat base having a squab 12 which rests against a resilient panel 13 similar to panel 8, which is supported by straps 14 constructed and adjustable as to length similar to straps 4. The hinged connection 11 of the frame member sides 11ª is near the bottom of the back rest to allow the upper end to be moved backward or forward. The top of the frame may have the same adjusting means as shown for the form of invention of FIGS. 3 to 6 inclusive.

FIGURES 3, 4 and 5 show another vehicle seat comprising a seat frame formed by two L-shaped side members 20 held apart by cross members. One cross member 21 connects the top of the side members 20, another cross member 22 connects the bottoms of the back of the side members 20. A plate 23 connects the bottom of the horizontal parts of the side members 20. The side members 20 are each formed of two marginally connected plates slightly spaced apart as shown in FIGURES 4 and 6.

One of the side members 20 has a slot 24 in its top margin through which a lap strap 25 passes. One end of the strap 25 is connected to retracting means and an inertia-operated locking device mounted in a housing 26 (see FIG. 4) below the seat. The other end of the strap 25 is secured to a buckle 26' which can be connected directly to the other side member 20. A diagonal strap 27 passes through a slot 28 in the cross member 21 and is connected to retracting means and an inertia-operated locking device mounted in a housing 29 (see FIG. 4). The other end of the strap 27 is secured to a buckle 30 which can be directly connected to the side member 20 adjacent the other buckle 26'. An occupant can therefore use either the lap strap alone or the diagonal strap alone or both together.

The seat is mounted on two seat mountings 31. The seat frame and seat mountings are of a sufficiently strong construction to withstand the stresses likely to occur when the vehicle suddenly decelerates with an occupant secured in the seat with the safety straps, e.g. in a crash.

Mounted between the side members 20 is a seat base 32 and a back rest 33. The arrangement of the back rest can be of any suitable kind and is not shown in detail.

The seat base 32 consists of a frame member 34 formed of two rigid side bars 35 held apart by a front bar 36 and a rear bar 37. Bar 37 is L-shaped or angle shaped in cross section. The two side bars 35 have upward extensions 38 at their rear ends.

Four straps 39 of nylon or other synthetic material webbing are secured at spaced intervals to the side bars 35 and hang downwardly to form a shallow cradle. A resilient panel 40 is seated on the straps 39 and holds them in the shallow U shape. A cushion 41 of polyurethane foam sits on top of the panel 40. The upper surface of the cushion 41 stands above the frame members 35 and has a concave depression 42, and is covered in a suitable material such as leather or leather cloth.

The side bars 35 of the frame member 34 each have a projecting lug 43 adjacent each end and at both sides.

The lugs 43 pass through slots 44 in the inner plate of the side members 20 (as shown in FIG. 6) and are connected to rectangular bosses 45 which fit within recesses 46 fitted in the outer plates of the side members 20. The recesses 46 and slots 44 permit the bosses to be moved vertically up and down so as to raise or lower either end of the seat frame 34. The rear slots 44 are such as to make a close sliding fit with the lugs 43. The front slots 44 are a little wider so as to allow the front lugs 43 to move slightly horizontally as the seat base is pivoted about either end.

Catch plates 47 are pivotally mounted at 48 between the inner and outer plate of the side members 20 just above the slots 44. A knob 49 is secured to each catch plate 45 to enable it to be pivoted against the action of a spring 50. The knobs 49 project into arcuate recesses 51 fitted in the outer plate of the side walls 20. The catch plates 47 each have two recesses 52 which can engage the lugs 43. The lugs 43 can also rest on the bottom of the slots 44. Thus each end of the seat can take up one of three positions so that there are nine possible positions of adjustment of the seat base.

To adjust the seat upwardly the occupant takes hold either of both front bosses 45 or both the back bosses 45, one with each hand and lifts them. The catch plates 47 are rotated in the direction of the arrow 53 to allow the lugs 43 past and then spring back to engage the lugs 43 in the next higher recess 52. To lower one end of the seat the appropriate knobs 49 are lifted so that the catch plates 47 no longer engage the lugs 43 and the seat drops.

Thus it will be seen that for adjustment the seat base can pivot about one end and be locked at the other end or vice versa.

When the vehicle goes over a bump the occupant is pressed downwardly on the seat. This has the effect of causing the panel 40 to bow downwardly and the vertical portions of the straps 39 swing inwardly. The ends of the panel 40 and the formerly vertical portion of the straps thus exert a sideways pressure on the cushion and tend to wrap the cushion around the occupant's buttocks and thighs so that he is located and held in a much more stable position than is usual on motor car seats.

Furthermore the high frequency vibrations can only be transmitted to the cushion through the straps 39. Some vibration is absorbed in the straps and some in turning through the right angle between the vertical and horizontal parts of the straps. The cushion is formed of a polyurethane foam which when deformed is slow to recover its original shape and is therefore very effective in absorbing high frequency vibrations.

The disposition of the seat between two strong side members 20 of box construction provides protection for the pelvis and thighs of the occupant, which parts of the body are particularly vulnerable if the car is flung sideways in a crash.

There is thus provided a seat for a motor car having a seat base which is both safe and effective to damp out vibrations and to hold the occupant in a stable position, and which in addition can be adjusted so as to be suitable for occupants of varying sizes.

I claim:

1. In a seat construction adapted for use in vehicles wherein the same is subject to vibration incident to travel, the combination of rigid side frame standards, a seat construction comprising a frame movably mounted on the rigid standards, said frame including spaced rigid side bars, flexible means connected to said side bars and hanging in position to provide a shallow cradle having a bottom portion and upstanding side portions, a flat resilient stiff panel capable of being bowed supported upon the lower portion of said flexible means with the sides of the panel lying inwardly of the side portions of the flexible means, and a flexible shape returning cushion supported by said panel having the lower portion thereof disposed in said cradle with the lower portions of the sides thereof facing the side portions of said flexible means, the top portion of said cushion extending above the rigid side bars, said panel when bowing under the influence of seat vibrations deforming the cradle provided by said flexible means by drawing the side portions of said flexible means inwardly and exerting side pressures tending to hold and locate the cushion and occupant secure on the seat.

2. In a seat construction adapted for use in vehicles wherein the same is subject to vibration incident to travel, the combination of rigid side frame standards, a seat construction comprising a frame movably mounted on the rigid standard, said frame including spaced rigid side bars, flexible cross straps connected to said side bars and hanging in position to provide a shallow cradle having a bottom portion and upstanding side portions, a flat resilient stiff panel capable of being bowed supported upon the lower portion of said flexible cross straps with the sides of the panel lying inwardly to the side portions of the flexible cross straps, and a flexible shape returning cushion supported by said panel having the lower portion thereof disposed in said cradle with the lower portions of the sides thereof facing the side portions of said flexible cross straps, the top portion of said cushion extending above the rigid side bars, said panel when bowing under the influence of seat vibrations deforming the cradle provided by said flexible cross straps by drawing the side portions of said flexible cross straps inwardly and exerting side pressures tending to hold and locate the cushion and occupant secure on the seat.

3. The seat construction defined in claim 1 in which means is provided for adjusting the length of the side portions of said flexible means and the level of the bottom portion of said flexible means.

4. The seat construction of claim 2 in which the connections of said flexible straps to said side bars at the upper ends of each of the side portions of said flexible straps comprises a windlass connected to said rigid side bars to vary the heights of the side portions of said straps and the level position of the bottom portions of said straps.

5. A seat construction as defined in claim 1 in which the frame is pivoted on the frame standards both at its forward end and rear end.

6. A seat structure as defined in claim 5 in which the pivots of the fore and rear ends of said open frame are adjustable in up and down directions.

7. In a chair construction the combination of rigid side standards, a back construction comprising a frame pivoted on the rigid side standards including spaced rigid side bars, flexible means connected to said side bars and being positioned to provide a shallow cradle comprising a rear portion and side portions, a flat resilient stiff panel capable of being bowed supported upon the rear portion of said flexible means with the side edges thereof lying inwardly of the side portions of said flexible means, and a flexible cushion supported by said back on said panel having the flexible sides thereof of its rear portion located in facing relation with the side portions of said flexible means and the outer portion thereof extending beyond the rigid side bars of said frame.

8. The back structure as defined in claim 7 in which the flexible means comprises a plurality of flexible cross straps connected to said side bars of the frame and having means to adjust the lengths thereof.

9. A seat construction as defined in claim 1 in which the cushion is formed of polyurethane foam.

10. In a seat construction the combination of rigid side standards, a seat construction comprising a pair of side rigid bars and spaced cross bar means, a flexible cushion, means to support said cushion in hanging relation on said side bars, and means to pivotally support the side bars on the standards, said last mentioned means comprising a rack member pivotally mounted on each standard having a plurality of teeth thereon to receive the pins of the seat supporting frame at different elevations, and spring means normally urging the rack teeth toward said pins.

11. In a seat construction for vehicles the combination of rigid supporting side standards, a rigid seat frame, means pivotally mounting the rigid seat frame at each end on said standards whereby the pivots may be varied as to elevation, the seat frame being provided with flexible side to side cross straps connected at each side thereto and defining a flexible cradle, a flexible seat supported on said cradle straps, and means connected to said seat frame for varying the cushion supporting height position of said straps.

References Cited by the Examiner

UNITED STATES PATENTS

| | | | |
|---|---|---|---|
| 1,987,921 | 1/1935 | Bertsch | 5—191 |
| 2,638,150 | 5/1953 | May | 297—338 |
| 2,812,146 | 11/1957 | Chaplin | 297—452 |
| 2,952,305 | 9/1960 | Bailey | 297—338 |
| 3,051,601 | 8/1962 | Shick | 5—361 |
| 3,088,773 | 5/1963 | Horrocks et al. | 297—452 |
| 3,107,944 | 10/1963 | Baermann | 297—452 |
| 3,118,153 | 1/1964 | Hood | 5—361 |
| 3,126,227 | 3/1964 | Bollinger | 297—385 |

FOREIGN PATENTS

| | | |
|---|---|---|
| 1,269,908 | 7/1861 | France. |
| 1,082,713 | 6/1960 | Germany. |
| 864,301 | 3/1961 | Great Britain. |
| 889,300 | 2/1962 | Great Britain. |

FRANK B. SHERRY, *Primary Examiner.*

C. A. NUNBERG, *Assistant Examiner.*